FIG. 1

June 11, 1963  R. W. GUNDLACH ET AL  3,093,068
METHOD AND APPARATUS FOR PATTERN REPRODUCTION
Filed Jan. 3, 1955  5 Sheets-Sheet 2

INVENTORS
ROBERT W. GUNDLACH
GEORGE R. MOTT
EDWARD R. SABEL
HOWARD W. ALBRECHT
BY
Frank A. Steinbilker
ATTORNEY

METHOD AND APPARATUS FOR PATTERN REPRODUCTION

Robert W. Gundlach, Spencerport, and George R. Mott and Edward R. Sabel, Rochester, N.Y., and Howard W. Albrecht, Columbus, Ohio, assignors, by direct and mesne assignments, to Xerox Corporation, a corporation of New York
Filed Jan. 3, 1955, Ser. No. 479,454
15 Claims. (Cl. 101—149.4)

This invention relates to the field of pattern reproduction and particularly to an improved method of and apparatus for affixing a predetermined dye pattern to the master sheet of a spirit duplicating set.

In the process of liquid or spirit duplication, currently in general use for the production of copies of printed material, the copy to be reproduced is typed or written on the "master" sheet of a spirit duplicating set which includes a "carbon" sheet comprising a layer of dye containing material mounted on a relatively smooth backing sheet so that the dye containing material may readily be stripped therefrom. The dye containing layer of the "carbon" sheet is arranged in juxtaposition to the master sheet, and the pressure of the type or writing instrument causes a quantity of dye from the carbon sheet to be deposited on the back of the master sheet in a pattern corresponding to that appearing on the front of the master sheet. When the master is thus prepared, it is placed on the rotating drum of a duplicating machine. As the copy paper is fed into the machine, it is moistened slightly, usually with an alcohol base dye solvent, as it comes in contact with either a roller or wick. Relatively little of the solvent is applied so that it evaporates quickly, but it is sufficient to pick up a thin layer of dye from the master and this dye remains on the copy paper in the form of the pattern deposited on the master sheet.

For the reproduction of typewritten copy, this process is quite adequate and is widely used, although the typist must exercise somewhat more than usual care in centering and laying out the work. A limitation of the process is that a constant typing pressure must be maintained in order to deposit a dye pattern of uniform thickness on the back of the master sheet. In the event the dye pattern is not of uniform thickness throughout, the thinner portions of dye are expended more quickly than the remainder of the dye pattern, with the result that the number of complete copies that can be made is limited by the thickness of the dye pattern in its thinnest portion. A further limitation is that the correction of typographical errors must be effected directly on the master sheet and requires substantially more time and effort than in conventional typing practice, and usually results in noticeable defects in the finished copy.

When the process is applied to the reproduction of written copy, line work, or art work, it becomes particularly cumbersome and unwieldy. In those cases, it is currently required that the desired copy be formed directly on the face of the master sheet in the exact form in which it is to be reproduced and that the writing or drawing pressure be maintained constant throughout in order to deposit a dye pattern of uniform thickness on the reverse side of the master sheet in exact correspondence with the line copy pattern formed on the front. Such practice obviously requires the services of a skilled artist or draftsman and, at best, is extremely expensive and time consuming. Furthermore, in its present form, the liquid duplicating process provides no method to make reproductions of existing copy such as prints, drawings, letterheads, or other forms of line copy, because there is no convenient method for forming a dye pattern on the master sheet that corresponds to the line copy pattern that should be reproduced.

In order to overcome the above-described limitations in the liquid duplicating process, the co-pending application, Serial No. 402,320, filed January 5, 1954, in the name of Lewis E. Walkup, discloses an improved method for the preparation of master sheets for use in the spirit duplicating process. In this method the copy to be reproduced is first prepared in its final form on any convenient type of paper and an electrostatic image of this copy is formed by the process of xerography on the photoconductive surface of a xerographic plate. An electroscopic powder, comprising a mixture of minute particles of resinous material and coloring matter, is then cascaded over this image in well-known manner so that powder particles adhere to the latent image and form a powder particle pattern of the copy to be reproduced. This pattern is then transferred electrostatically to the surface of the dye layer of the carbon sheet of a spirit duplicating set and is held thereon by electrostatic attraction. The carbon sheet is then inserted into a vapor chamber that contains an atmosphere of a liquid that is a solvent for the resinous constituent of the powder particles. The resinous particles absorb these vapors and are thereby tackified, i.e., reduced in viscosity and fused together in a mass that is internally cohesive and has a surface that is adhesive to many other materials including both the carbon and master sheets of conventional spirit duplicating sets. When the powder particle pattern reaches the proper consistency, the master sheet of the spirit duplicating set is superposed thereon and the assembled set is passed between pressure rollers. In this step of the process, both the master and carbon sheets are pressed firmly against opposite sides of the now viscous powder particle pattern so that a portion of the dye layer of the carbon sheet, corresponding to the pattern of copy to be reproduced, is caused to adhere to the master sheet and is firmly bonded thereto as the powder solvent evaporates and the pattern hardens. Thereafter, the carbon and master sheets are separated and the adherent portion of the dye layer is literally pulled from the surface of the carbon sheet and remains affixed to the master sheet. Thereafter, the master sheet may be used in the usual manner in the spirit duplicating process.

Although the method disclosed in the above-mentioned application is basically sound and may be used by skilled operators for the formation of master sheets in most spirit duplicating applications, it has been found that a fair degree of experience is required in order to determine the optimum time at which the master and carbon sheets should be pressed together. If the pressing is done too quickly after tackification, the powder particle pattern may be too soft and may be squeezed beyond the boundaries of the desired pattern. If the tackified pattern has already started to harden, it may not form a complete bond between the master and carbon sheets throughout its entire area so that portions of the ultimate dye pattern are not transferred to the master sheet or, if transferred, are not of uniform thickness with the remainder of the dye pattern. In addition, varying conditions of ambient temperature and humidity further complicate these problems for the inexperienced operator.

Further investigation has shown that the tackification and bonding of the powder particle pattern is primarily a problem of plastic deformation that is dependent upon the viscosity of the powder particles and the compressive stress applied in the bonding process. On this basis it can be shown that a given deformation of the powder particle pattern is proportionately related to viscosity, time, and pressure, and that optimum bonding of the dye layer pattern can be obtained by the proper control of these parameters.

Since absorption of the resin solvent occurs at the upper surface of the powder particle pattern, the solvent must diffuse gradually downward. Diffusion continues until saturation is reached or until solvent vapors are no longer available at the surface. Thus, there is always a tendency toward diminution of the viscosity gradient or toward a condition of equilibrium. It can be shown that proper control of the viscosity gradient permits a more accurate selection of the time at which the master and carbon sheets should be pressed together. Ideally, it is found that if the tackification of the powder particle pattern is permitted to continue in the solvent vapor for a sufficient time to produce a desired degree of viscosity and that pressure is applied in timed relation to the achievement of such condition, that the tackification time for a given type of resinous powder particle and the correct pressure to produce optimum bonding can be accurately predetermined and can serve as the basis of an improved method and apparatus for the production of spirit duplicating master sheets that can readily be employed in a routine manner by inexperienced personnel.

The principal object of the present invention is to provide an improved method of and apparatus for forming a predetermined dye pattern on the master sheet of a spirit duplicating set. A further object of the invention is to provide an improved method and apparatus for bonding predetermined portions of the carbon layer of a spirit duplicating set to the master sheet thereof. A further object is to provide an improved apparatus for tackifying a pattern of powdered resinous material arranged between the master and carbon sheets of a spirit duplicating set. A further object of the invention is to improve the method of and apparatus for the rapid, efficient, and economical production of master sheets for use in spirit duplicating processes.

Briefly, these and other objects of the invention are attained by progressively tackifying successive portions of the powder particle pattern in a resin solvent atmosphere and by progressively pressing the corresponding portions of the master and carbon sheets into intimate contact therewith in timed relation to the attainment of the proper degree of tackification of each portion. In addition, the invention provides means for varying the tackification time and the pressure applied whereby the method and apparatus of the invention may readily be employed for the formation of master sheets from any of a wide variety of commercially available spirit duplicating sets under widely variant conditions of ambient temperature and humidity.

The term "tackified" and the several variant forms thereof used throughout the specification are employed to define the condition of the powder particles that form the copy pattern when treated in a manner such that the individual particles soften and coalesce and in which state they become sticky and readily adhere to other surfaces. Although this condition necessarily requires a flowing together of the particles to effect a thorough fusion thereof, it is to be understood that the extent of such flowing is not sufficient to extend beyond the boundary of the pattern in which the particles are formed.

The method of the invention and a preferred device for implementing its application in the preparation of spirit duplicating masters are shown in the appended drawings, in which:

FIGS. 2 through 9, inclusive, are schematic illustrations of the several steps of the method of FIG. 1, wherein

Spirit duplicating sets of the type with which the invention may be employed are in wide commercial use and many types of these sets are available from various manufacturers. In general, each set comprises a master sheet and a carbon sheet attached along one edge by a suitable hinge. The set may also include a separating sheet to prevent smudging of the carbon sheet during handling but which is removed prior to the actual use of the set. The master sheet usually comprises a firmly coherent, smooth surfaced sheet of white paper that is readily receptive of impressions from typewriter type or conventional writing instruments. The carbon sheet comprises a firmly coherent, backing sheet of relatively glossy surfaced paper on which a thin layer of aniline dye material is uniformly spread. The dye material is usually suspended in a wax coating or similar form of binder to make it adhere to the carbon sheet, and the particles of such coating are only loosely coherent with each other whereby the pressure applied by a writing instrument or type face readily detaches the impressed portion from the remainder of the dye layer. Also, since the carbon backing sheet has a smoother surface than the master sheet, the dye layer in usual practice adheres more readily to the master sheet so that impressed portions are conveniently broken away from the carbon sheet when the components of the duplicating set are separated. Similarly, as in the above-mentioned application and in the present instance, the simultaneous bonding of the powder particle pattern to the master sheet and dye layer results in a firm bond between these materials that is much stronger than the bond between the dye layer and the carbon backing sheet so that the bonded portions of the dye layer are cleanly stripped from the backing sheet when the sheets are separated.

The xerographic formation and transfer of powder particle patterns of copy to be reproduced, as employed herein, is basically the same as that disclosed in Carlson Patent 2,297,691, issued October 6, 1942, wherein a plate comprising a coating of photoconductive insulating material on a conductive backing is given a uniform electric charge over its surface and is then exposed to the subject matter to be reproduced, usually by conventional projection techniques. This exposure discharges the plate areas in accordance with the light intensity which reaches them, thereby creating an electrostatic latent image on or in the plate coating. Development of the image is effected with a finely-divided material such as an electroscopic powder which is brought into contact with the coating and is held thereon electrostatically in a pattern corresponding to the electrostatic latent image.

The developing agent employed may be of any convenient type suitable to the requirements of the particular application, the type disclosed in Patent 2,618,551, issued November 18, 1952, to L. E. Walkup being illustrative of a form that may be used in most instances although a wide variety of other resinous developing powders may be employed. As disclosed in this patent, the developer comprises a combination of coated glass bead carriers together with a mixture of powdered resin and carbon black particles. These components are mixed together to establish an electrostatic charge on the powder particles that is of opposite polarity to the charge comprising the latent xerographic image whereby, when the developer is cascaded over an exposed xerographic plate, the resin and carbon black particles adhere to the charged surfaces of the plate and form a powder image or pattern of the latent image previously formed thereon. In the general application of xerography, the resin particles are subsequently bonded to the finished copy by the application of heat and serve to secure the carbon black particles which provide the coloring matter in the finished copy. In the present application, the resin particles form the essential element of the powder mixture in acting as the bonding agent that unites the dye layer of the carbon sheet to the master sheet of the spirit duplicating set. The carbon black particles serving primarily to produce a readily visible image on the xerographic plate whereby an operator may check the completeness of the copy that is formed on the plate.

Figure 1:
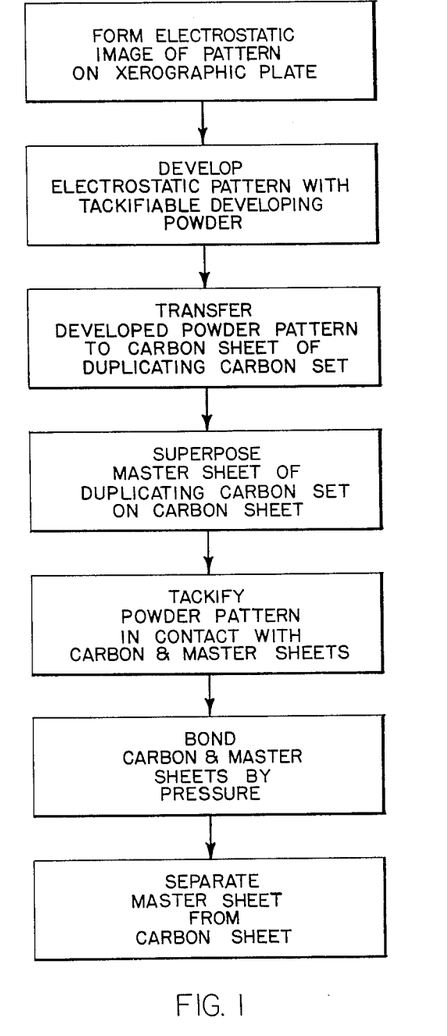
FIG. 1 is a flow diagram illustrating the several steps of the method of the invention, as applied in forming a predetermined pattern of dye material on a master sheet for use in a spirit duplicating process.
Figure 2:
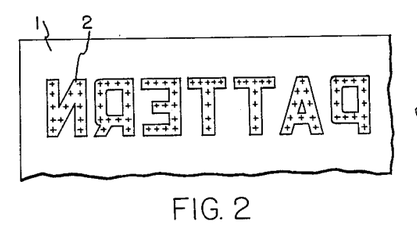
FIG. 2 is a plan view of a xerographic plate bearing an electrostatic image of a predetermined pattern formed thereon.
Figure 3:
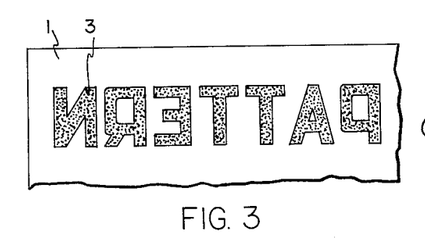
FIG. 3 is a plan view of the xerographic plate of FIG. 2 wherein the latent image of the predetermined pattern is developed with a tackifiable developing powder.
Figure 4:
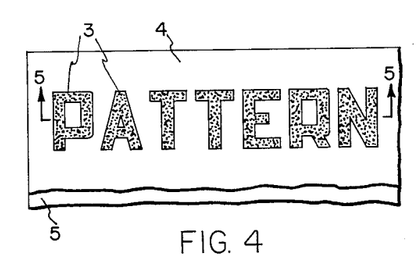
FIG. 4 is a plan view of a portion of a carbon sheet of a carbon duplicating set to which the powder pattern of FIG. 3 has been transferred.
Figure 5:
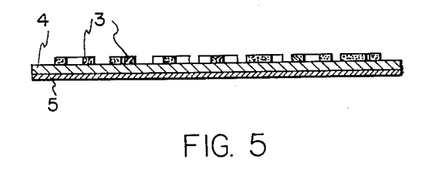
FIG. 5 is a sectional view of the carbon sheet and powder pattern taken on the line 5—5 of FIG. 4.
Figure 6:
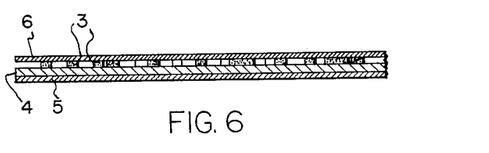
FIG. 6 is a sectional view of the elements of FIG. 4 after the master sheet is superposed thereon.

Referring to the drawings the several steps of the method of the invention outlined in FIG. 1 are schematically illustrated in FIGS. 2 through 9, inclusive, wherein a xerographic plate 1 (see FIG. 2), comprising a layer of photoconductive material mounted on a conductive backing, is impressed with a reverse reading electrostatic image 2 of a predetermined pattern that is formed thereon by conventional xerographic processes. In this figure plus signs are employed to indicate the electrostatic charge forming the latent image of the pattern after the plate is exposed. After exposure, a suitable powder particle developing agent, as described above, is cascaded over the plate whereby the electrostatic image 2 is transformed to a pattern of powder particles designated by reference character 3 (see FIG. 3). Thereafter, powder pattern 3 is transferred electrostatically to the carbon layer 4 of the carbon sheet 5 of a spirit duplicating set (see FIGS. 4 and 5) to form a direct reading pattern thereon. The master sheet 6 of the duplicating set is then superposed on the powder pattern on the carbon sheet (see FIG. 6), whereby in effect the powder particle pattern is sandwiched between the carbon layer and the master sheet.

Figure 7:
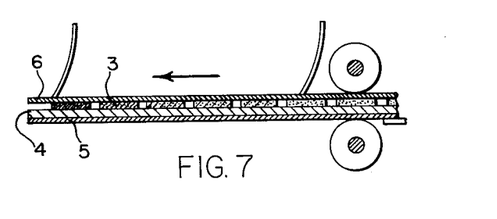
FIG. 7 is a sectional view of the assembled spirit duplicating set during the tackification of the powder particle pattern.
Figure 8:
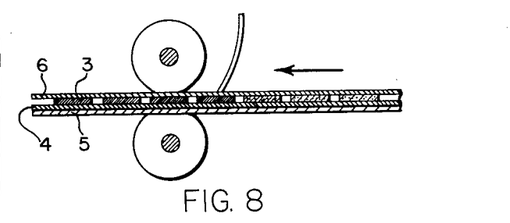
FIG. 8 is a sectional view of the elements of FIG. 7 during the bonding of the powder particle pattern.
Figure 9:
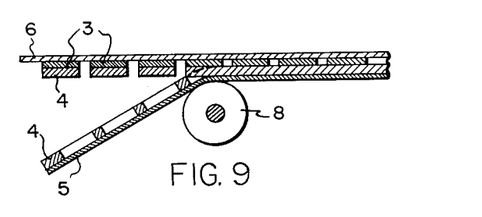
FIG. 9 is a sectional view illustrating the relationship of the several elements of FIG. 7 while the master and carbon sheets of the duplicating carbon set are being separated.
Figure 10:
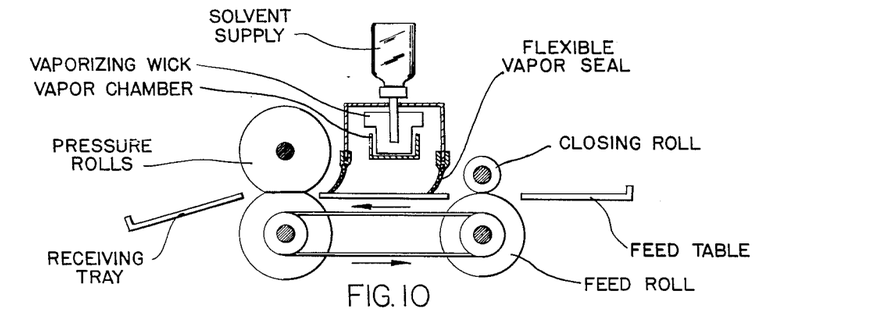
FIG. 10 is a schematic side elevation of the essential elements of a tackifying and bonding apparatus for carrying out the method of the invention.

The assembled duplicating set is then placed on the feed table of a tackifying and bonding apparatus, such as that shown in FIG. 10, and its leading edge is engaged with a pair of feed rolls These rolls are rotated at a constant but relatively slow peripheral speed and serve to push the leading edge of the set beneath a flexible vapor seal and into a vapor chamber. Within the chamber there is an atmosphere of resin solvent that is obtained from a fluid supply of the solvent that is vaporized by a vaporizing wick apparatus located in the chamber. As the duplicating set passes through the vapor chamber, the solvent vapor progressively permeates the master sheet and is absorbed by the powder particles whereby the powder particles are progressively tackified as a function of time, as indicated in FIG. 7. By the proper selection of feed roll speed, the progression of the set through the chamber is arranged to be completed when the powder particles arriving at the exit vapor seal are in the proper condition of tackification for bonding. Immediately thereafter, the leading edge of the duplicating set is engaged by a pair of pressure rolls that rotate at a peripheral speed equal to or slightly in excess of the peripheral speed of the feed rolls. The pressure rolls are preferably constructed of a soft resilient material and are urged into contact with each other by an external clamping device, described below, whereby the contacting surfaces of the rolls are distorted to form a broad pressure-applying surface. The pressure rolls serve to pull the duplicating set through the vapor chamber and concomitantly press the master sheet and dye layer into intimate and prolonged contact, as in FIG. 8, so that the tackified powder particles arranged therebetween are slowly forced to flow into the interstices of the opposed surfaces and form an adhesive layer between the sheets that corresponds to the outline of the pattern to be reproduced. By this arrangement, successive portions of the duplicating set are progressively pressed together in timed relation to the tackification of the intervening powder particles and are maintained in contact for a period of time sufficient to form a firm bond between the sheets. As the duplicating set is passed through the pressure rolls it slides into a receiving tray whereon it is permitted to stand for a period of a few second to permit the tackified powder particle pattern to harden. When the master sheet and the dye layer of the carbon sheet are firmly united by the coalesced powder particles of the predetermined pattern, the sheets are separated either by stripping in the usual manner or by sliding the carbon sheet over a rod 8 or other rounded surface (as in FIG. 9) whereby the bonded dye particles are cleanly broken from the dye layer remaining on sheet 5. Master sheet 6, to which a dye pattern conforming to the predetermined pattern is firmly affixed, may now be used for producing copies in a duplicating machine in the usual manner.

Figure 11:
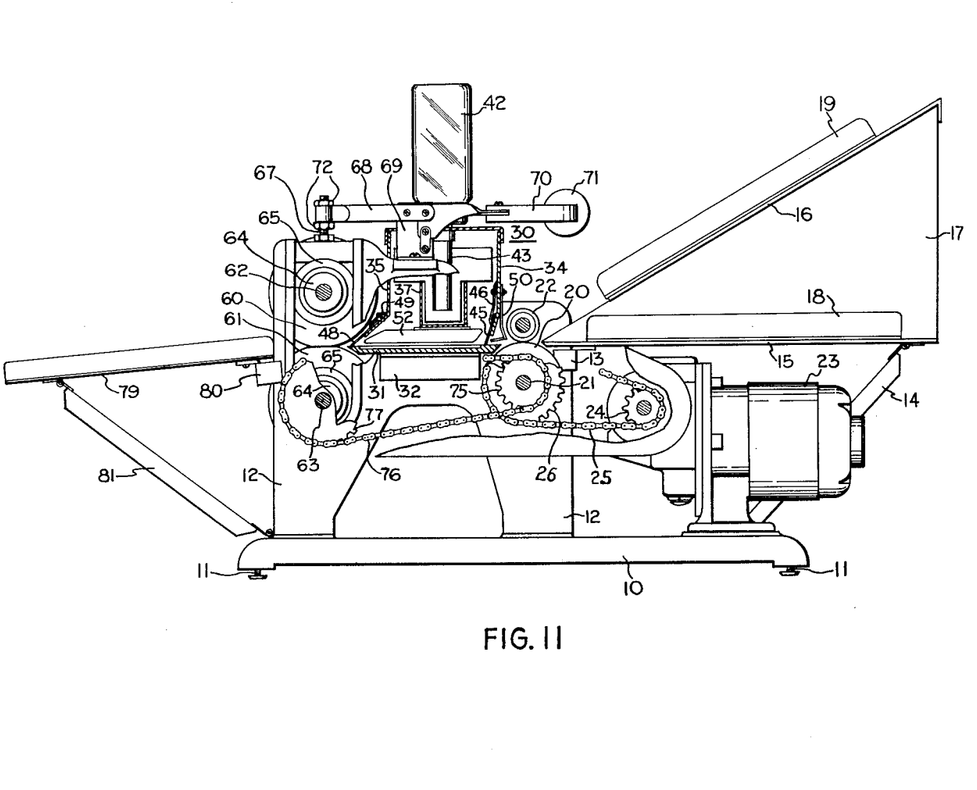
FIG. 11 is a side elevation, partly in section, of a preferred form of tackifying and bonding apparatus for use in the preparation of spirit duplicating master sheets.
Figure 12:
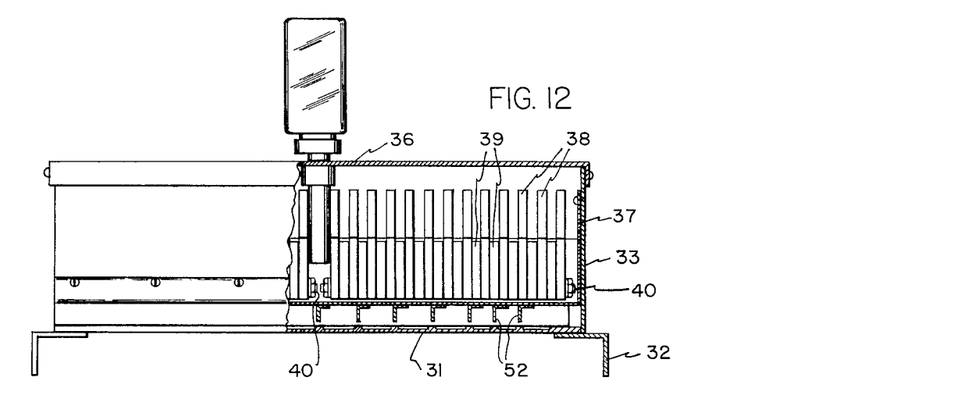
FIG. 12 is a front elevation, partly in section, of the vapor chamber and solvent vaporizing apparatus of FIG. 11.
Figure 13:
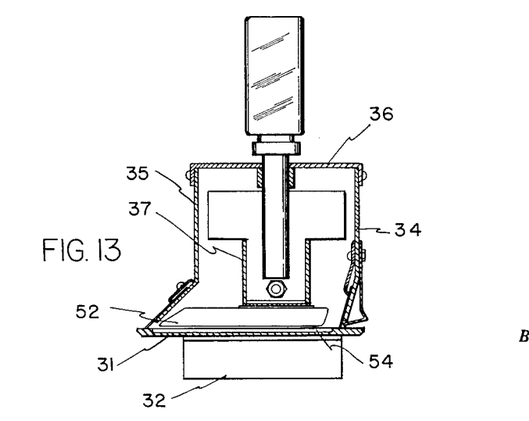
FIG. 13 is a side elevation, partly in section, of the apparatus of FIG. 12.

Although a variety of devices may be employed to effect the progressive tackification and bonding of the powder particle pattern in accordance with the method of the invention described above, a preferred form of device for this purpose is shown in FIGS. 11 through 13, inclusive. Referring to FIG. 11, the several elements of the apparatus are mounted on a base casting 10 that is provided with adjusting screws 11 whereby the apparatus may be leveled when set up for operation. Supported on opposite sides of the base casting are a pair of side frames 12 on which the several elements of the feed tray, feed rolls, vapor chamber, and pressure rolls are supported. On the right hand ends of frame 12 are a pair of brackets 13 which, together with strut 14, support a feed table 15 in substantially horizontal position so that the carbon sheet of the spirit duplicating set may be placed thereon preparatory to advancing it into the tackifying apparatus.

Although the master sheet of the duplicating set may be superposed on the carbon sheet while it is on table 15, it is preferred that it be maintained separated from the carbon sheet to prevent smudging of the powder particle pattern which, at this point in the operation, is loosely held on the dye layer by an electrostatic charge. For this purpose there is provided a second angularly disposed feed table 16 that is supported on a suitable bracket 17 so that the lower end of table 16 is held above the level of feed table 15 and an opening is provided between the edges of the tables. With this arrangement, the duplicating set assembly may be held open after the powder particle pattern is transferred to the dye layer thereof and be slipped in from the sides so that the carbon sheet rests on table 15 and the master sheet rests on table 16. Guide rails 18 and 19 are provided on the sides of tables 15 and 16, respectively, where the edges of the carbon and master sheets may be properly aligned with each other.

In order to advance the duplicating set through the tackifying apparatus there is provided a feed roll 20, having a frictional surface, which is mounted on a shaft 21 that is suitably journaled in frames 12. Cooperating with feed roll 20 is a closing roll 22 that is loosely journaled in side frames 12 so that it bears against roll 20 in the absence of a duplicating set but rides upon the master sheet when a set is advanced to feed roll 20 and holds the set in contact with the frictional surface of the feed roll. By this arrangement roll 22 is effective to close the master sheet progressively against the carbon sheet as the set is advanced, without smudging the powder particle pattern, and permits movement of the set independently of roll 20, as described below. Feed roll 20 is rotated by a chain and sprocket connection from a motor 23, the motor serving to rotate a sprocket wheel 24 that drives chain 25 which in turn rotates a sprocket 26 that is secured on shaft 21.

The feed rolls pass the duplicating set into a vapor chamber, generally designated by reference character 30, that comprises a covered, box-like structure supported between side frames 12. Specifically, the vapor chamber includes a base plate 31 (see also FIGS. 12 and 13) that is supported by brackets 32 mounted on frame castings 12 and is provided with vertical side walls 33 to which are connected front and rear walls 34 and 35, respectively. Each of the wall members 34 and 35 is provided with a cutout portion along its lower edge which, in combination, with base plate 31, form slots to permit the duplicating set to be passed through vapor chamber 30. The upper end of vapor chamber 30 is covered by a rectangular cover member 36 that forms a relatively tight vapor seal with the wall members. Each of the vapor chamber members is preferably formed of corrosion resistant material, such as stainless steel, to minimize the possibility of chemical reaction with the solvent used to tackify the powder particles.

The solvent vaporizing apparatus includes an open, fluid-tight trough member 37 that extends across the entire width of chamber 30 and is suspended at each end by connections to side walls 33. Contained within chamber 37 are a plurality of alternately arranged wick members 38 and 39, preferably formed of heavy felt material, that are secured together in two separate assemblies by rods 40. Wick members 38 are each preferably cut in the form of a block T that fits closely within the outline of trough member 37 whereby the cross members of each T are supported on the upper edges of the trough and the bottoms are held slightly above the bottom of the trough to permit unimpeded flow of the solvent therein. Wick members 39 are of rectangular configuration and are arranged as spacers between members 38 thereby to provide a substantial area of exposed wick surface. The resin solvent that is employed as a tackifying agent is contained in an inverted liquid reservoir 42 that is provided with an elongated spout 43 that extends through a hole in cover member 36 substantially to the bottom of trough 37. By this arrangement, liquid from reservoir 42 flows downwardly into trough 37 and is absorbed by wick members 38 and 39, the level of solvent at the bottom of trough 37 being maintained slightly above the end of the spout 43 by the pressure of the atmosphere acting on the surface of the liquid at the bottom of the trough.

In this manner the tackifying liquid is dispersed through a large volume of wick material having an extensive exposed surface area whereby the liquid is readily volatilized in the atmosphere of the vapor chamber to form a substantially saturated atmosphere of solvent vapor therein. Any of a variety of resin solvents may be used for this purpose. However, it is preferred that the solvent be of a type that forms a vapor that is heavier than air, such as trichloroethylene or Freon, so that the vapor is most highly concentrated in the region at the bottom of vapor chamber 30.

In order to retain the vapor within chamber 30 while providing suitable means for sliding a duplicating set therein, vapor seals are provided for the slots formed by wall members 34 and 35 and base plate 31. For this purpose, a flexible, vapor impervious strip 45 is secured over the slot formed by wall 34 by a clamping device 46 that serves to clamp the upper edge of strip 45 against the lower portion of wall member 34. Similarly, a vapor seal 48 is secured by a clamp 49 to wall portion 35 to cover the slot formed by wall member 35 and base 31. The lower ends of vapor seals 45 and 48 bear against the surface of base plate 31 and the edges of each seal are substantially abutting end walls 33 so that the atmosphere within the vapor chamber is maintained substantially out of contact with ambient air.

To facilitate the movement of the duplicating set through the vapor chamber, the outer face of wall member 34 is provided with an angularly shaped guide bar 50 that serves to direct the duplicating set against the lower edge of vapor seal 45 as it is pushed into the chamber by feed roll 20, the horizontally extending lip of guide 50 serving to prevent buckling of the set as it is moved into engagement with the vapor seal. As the duplicating set passes over base 31 it is prevented from buckling and is held substantially in contact with the base by a series of longitudinally arranged guide bars 52 which are secured to the bottom of trough member 37. In addition, base plate 31 is preferably formed with a plurality of longitudinally extending ridges 54 on which the duplicating set rides whereby friction between the duplicating set and the base is reduced. The ridges 54 also provide troughs 55 therebetween wherein any condensed vapor may settle without coming in direct contact with the materials of the duplicating set. In the particular arrangement shown the ridges and troughs on base plate 31 are formed by etching the trough portions out of the base plate material and leaving the intervening portions of the plate to serve as ridges on which the duplicating set rides. Obviously, the same effect may be achieved by forming the base plate of sheet metal and embossing ridge portions thereon.

Immediately adjacent the left end of base plate 31 are a pair of mutually opposed pressure rolls 60 and 61 which are mounted respectively on shafts 62 and 63. Each of the shafts is rotatably mounted at either end thereof in ball bearings 64 that are pressed into bearing rings 65, the edges of which fit in milled grooves cut in the inner surface of a U-shaped slot formed in each of the side frames 12. Rolls 60 and 61 are preferably formed of a soft rubber of approximately 20.0 durometer hardness whereby they may be urged together under sufficient pressure to distort the opposing surfaces of the rolls to form an extended pressure-applying surface. By this means the pressure applied to the duplicating set is maintained for a sufficient time period to permit the flow of the tackified powder particle pattern into the interstices of the master sheet and the dye layer of the carbon sheet.

External pressure may be applied to the rolls by any convenient means whereby a surface pressure of approximately fifteen pounds per square inch may be obtained. A suitable device for this purpose is illustrated in FIG. 11 and comprises a Destaco toggle mechanism, type 205-A, which is manufactured by the Detroit Stamping Company. Essentially this mechanism comprises adjustable rods 67 that bear, on each side of the apparatus, against the upper surfaces of pressure pads 66 that rest on bearing rings 65 and are guided for vertical movement by having their ends fitted in the milled slots inside frames 12. Each rod 67 is supported in the clevis end of a link 68 that is pivotally mounted on a vertical standard 69 supported on a boss on side frame 12. Links 68 are actuated by a suitable linkage mechanism (not shown), by bail 70 that is operated by a handle 71 whereby, when the handle is elevated, each link 68 is rocked about its pivot to release the pressure on rolls 60 and 61, whereas, when handle 71 is moved to the position illustrated in the drawing, links 68 are rocked to a position to apply pressure on the rolls and are locked in such position. Suitable adjusting nuts 72 are provided on threaded portions of rods 67 whereby the pressure applied by the toggle mechanism may be varied, if desired. Pressure rolls 60 and 61 are driven by means of a chain and sprocket connection, from shaft 21, which comprises a sprocket 75 fixed on shaft 21, chain 76, and a sprocket 77 fixed on the shaft 63. In order to eliminate any possibility of buckling the portion of the duplicating set between feed roll 20 and pressure rolls 60, 61, the sprocket ratio is so selected that the peripheral speed of rolls 60, 61 is equal to or slightly greater than the peripheral speed of feed roll 20. By this arrangement, as the leading edge of the duplicating sheet passes out of vapor chamber 30, it is engaged by pressure rolls 60, 61 and is thereafter moved independently of feed roll 20. In the event the peripheral speed of rolls 60, 61 is slightly greater than that of roll 20, the trailing end of the duplicating set merely slides slowly over the surface of feed roll 20 without distorting the powder particle pattern arranged between the carbon and master sheets.

As the duplicating set is passed through the pressure rolls it is moved onto a receiving tray 79 that is supported at one end by brackets 80 mounted on side frames 12, and is held at a slightly inclined angle by a strut 81 that bears against base plate 10. Preferably, the end of receiving tray 79 adjacent the pressure rolls is arranged slightly lower than the contact point of the rolls whereby a plurality of duplicating sets may be fed successively onto the receiving tray without interference. By the proper selection of roll speed and pressure the tackified pattern is completely hardened by the time the duplicating set drops into tray 79. Thus, the master sheet is immediately available to be separated from the carbon sheet and to be used in a conventional spirit duplicating machine.

By the arrangement thus described, duplicating sets having a powder particle pattern arranged between the carbon and master sheets thereof may conveniently be fed through the vapor chamber at any desired speed to effect the proper degree of tackification of the powder pattern before the leading edge of the sheet is gripped by pressure rolls 60 and 61. In general, it is found that best results are obtained when the duplicating set is advanced at the rate of 1/10 inch per second and pressure of fifteen pounds per square inch is applied by the pressure applying surfaces of pressure rolls 60, 61. Under these conditions, approximately two minutes are required to tackify the powder particle pattern and bond the desired dye pattern in uniform thickness to the master sheet. This period of time has been found particularly desirable since it permits the machine operator sufficient time to prepare another duplicating set for processing, in accordance with steps 1 to 5 of the above-described method, in time to insert the new set into the machine as soon as the preceding set is clear of feed roll 20. In addition, the preferred pressure is sufficient to effect complete coverage of dust and lint particles that may fall on the powder pattern, and is one that can readily be achieved by inexpensive and conveniently available devices. Should a different speed and pressure ratio be found desirable, as for different types of duplicating sets or under differing conditions of temperature and humidity, adjustment can be made by varying the pressure applied by pressure rolls 60 and 61, as described above, or by varying the speed at which the several feed rolls are driven. The latter result may be obtained conveniently by providing a variable speed motor 23 for driving the feed rolls or by providing a variable speed transmission in the driving connection between the motor and the roll driving mechanism.

An alternate form of tackifying and bonding apparatus for carrying out the method of the invention, described above, is shown in FIG. 14 wherein the several elements of the apparatus are enclosed in a box-like housing 85. In this arrangement the vaporizing apparatus comprises two laterally-arranged troughs 86 that are interconnected by a tube 87 whereby a constant level of liquid solvent, supplied from a solvent reservoir 88, is maintained in both troughs. The solvent is vaporized by means of a felt wick 89 that extends across the underside of the cover or housing 85 and has its opposite ends immersed in the solvent in each of the troughs 86.

Figure 14:
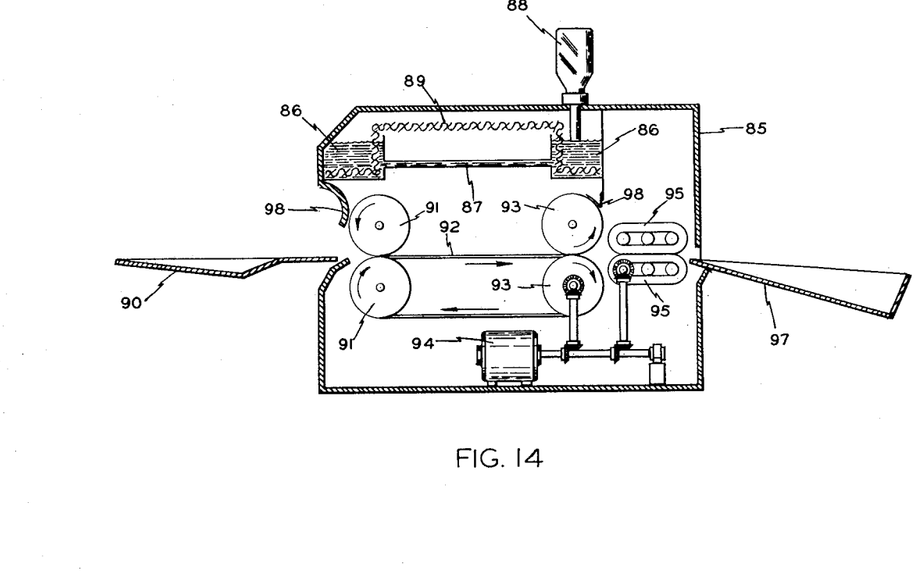
FIG. 14 is a schematic side elevation of an alternate form of tackifying and bonding apparatus that may be employed with the invention.

The duplicating set is fed through this apparatus by placing it on a feed table 90 and advancing it into engagement with feed rolls 91, the lower roll of which is connected by a flexible belt 92 to the lower roll of a second pair of rolls 93. Suitable motor means 94 are provided for rotating the rolls at the desired speed. Belt 92 may comprise an endless sheet of stainless steel or plastic material for supporting the duplicating set or, preferably, may comprise a plurality of relatively thin strips or wires whereby condensed droplets of solvent vapor are free to fall through to the bottom of housing 85 and cannot come in contact with the materials of the duplicating set.

In this arrangement the feed roll speed is adjusted, as above, so that the powder particle pattern arranged between the sheets of the duplicating set is exposed to the solvent atmosphere for the precise period of time required to effect proper tackification, at which point the leading edge of the set enters bonding rolls 93 which are pressed together by suitable pressure means to exert an initial bonding pressure of approximately 15 pounds per square inch. By this arrangement the powder pattern is initially bonded to the master sheet and dye layer of the duplicating set and is then fed to a second set of pressure rolls or belts 95. The latter set of pressure-applying devices is arranged preferably in the form of endless belts of flexible material that rotate over suitably spaced rollers 96 whereby prolonged pressure is applied to the initially bonded duplicating set to cause the tackified powder pattern to flow into the interstices of the master and carbon sheets and form a firm bond therebetween corresponding to the outline of the powder pattern. The pressure applied by rolls 95 and the driving speed thereof is such that complete bonding is accomplished as the duplicating set completes its passage through the rolls whereupon it is delivered to a receiving tray 97. As above, flexible vapor seals 98 are employed to contain the solvent vapor in the vapor chamber.

Although the method and the apparatus of the invention are described with specific reference to their application to the field of spirit duplicating, it is apparent that they may readily be applied in other fields for the purpose of pattern transfer within the scope of the invention. For example, should it be desired that a direct reading pattern be formed on the master sheet, as for use in an offset printing process, the reverse-reading powder image on the xerographic plate may be transferred directly to the master sheet instead of to the carbon sheet, as described above. Thereafter, the process is carried out in the same manner by superposing the sheets, tackifying the powder pattern, and separating the sheets to pull a direct-reading image of pattern material from the carbon sheet. Similarly, numerous other applications of the invention will be apparent to those skilled in similar or related arts whereby a desired pattern-forming material that is difficult of convenient application or handling may be bonded to a supporting sheet or layer by means of a common bonding agent that can be conveniently formed into the desired pattern by xerographic processes. Therefore, it is intended that all matter contained in this specification be interpreted in an illustrative sense, and that the invention be limited only as defined in the appended claims.

What is claimed is:

1. The method of forming a predetermined dye pattern on the master sheet of a spirit duplicating set comprising the steps of forming a tackifiable powder particle image of such predetermined pattern on the dye layer of the carbon sheet of a spirit duplicating set, superposing the master sheet of such set on the dye layer of said carbon sheet, passing the assembled set through a tackifying chamber whereby successive portions of said powder particle image are progressively tackified to a degree to adhere to the material of both said sheets, progressively pressing successive portions of the master and carbon sheets into intimate contact at a predetermined pressure in timed relation to the tackification of corresponding portions of the intervening powder particle image, maintaining said pressure for a time period to permit said tackified image to form a bond between the materials of said sheets, and separating said sheets, whereby an area of dye layer corresponding to the area of the predetermined pattern is separated from the carbon sheet and is affixed to the master sheet.

2. The method of forming a predetermined dye pattern on the master sheet of a spirit duplicating set comprising the steps of forming an image of powdered material corresponding to such predetermined pattern on the dye layer of the carbon sheet of a spirit duplicating set, said powdered material including resinous particles capable of being tackified in a resin solvent atmosphere, superposing the master sheet of such set on the dye layer of said carbon sheet, passing the assembled set through a tackifying chamber whereby successive portions of said powdered material are progressively tackified in a resin solvent atmosphere to a degree to adhere to the material of both said sheets, progressively pressing successive portions of the master and carbon sheets into intimate contact at a predetermined pressure in timed relation to the tackification of corresponding portions of the intervening powdered material, maintaining said pressure for a time period to permit said tackified powdered material to form a bond between the materials of said sheets, and separating said sheets, whereby an area of dye layer corresponding to the area of the predetermined pattern is separated from the carbon sheet and is affixed to the master sheet.

3. The method of forming a predetermined dye pattern on the master sheet of a spirit duplicating set comprising the steps of forming an image of powdered material corresponding to such predetermined pattern on the dye layer of the carbon sheet of a spirit duplicating set, said powdered material including resinous particles capable of being tackified in a resin solvent atmosphere, progressively superposing successive portions of the master sheet of such set on corresponding portions of the dye layer of said carbon sheet, passing the assembled set through a tackifying chamber whereby successive portions of said powdered material are progressively tackified in a resin solvent atmosphere to a degree to adhere to the material of both said sheets, progressively pressing successive portions of the master and carbon sheets into intimate contact at a predetermined pressure in timed relation to the tackification of corresponding portions of the intervening powdered material, maintaining said pressure for a time period to permit said tackified powdered material to form a bond between the materials of said sheets, and separating said sheets, whereby an area of dye layer corresponding to the area of the predetermined pattern is separated from the carbon sheet and is affixed to the master sheet.

4. The method of forming a predetermined dye pattern on the master sheet of a spirit duplicating set comprising the steps of forming an electro-static image of such predetermined pattern on a xerographic plate, coating said pattern image with a powdered resinous material, transferring the thus-formed pattern of powdered material to the dye layer of the carbon sheet of a spirit duplicating set, superposing the master sheet of such set on the dye layer of said carbon sheet, passing the assembled set through a tackifying chamber whereby successive portions of said powdered material are progressively tackified to a degree to adhere to the material of both said sheets, progressively pressing successive portions of the master and carbon sheets into intimate contact at a predetermined pressure in timed relation to the tackification of corresponding portions of the intervening pattern of powdered material, maintaining said pressure for a time period to permit said tackified powdered material to form a bond between the materials of said sheets, and separating said sheets, whereby an area of dye layer corresponding to the area of the predetermined pattern is separated from the carbon sheet and is affixed to the master sheet.

5. The method of forming a predetermined dye pattern on the master sheet of a spirit duplicating set comprising the steps of forming an electrostatic image of such predetermined pattern on a xerographic plate, coating said pattern image with a powdered resinous material, transferring the thus-formed pattern of powdered material to the dye layer of the carbon sheet of a spirit duplicating set, progressively superposing successive portions of the master sheet of such set on corresponding portions of the dye layer of said carbon sheet, passing the assembled set through a tackifying chamber whereby successive portions of said powdered material are progressively tackified in an atmosphere of resin solvent to a degree to adhere to the material of both said sheets, progressively pressing successive portions of the master and carbon sheets into intimate contact at a predetermined pressure in timed relation to the tackification of corresponding portions of the intervening pattern of powdered material, maintaining said pressure for a time period to permit said tackified powered material to form a bond between the materials of said sheets, and separating said sheets, whereby an area of dye layer corresponding to the area of the predetermined pattern is separated from the carbon sheet and is affixed to the master sheet.

6. The method of bonding a predetermined dye pattern to the master sheet of a spirit duplicating set comprising the steps of forming a tackifiable powder particle image of such predetermined pattern on the dye layer of the carbon sheet of a spirit duplicating set, superposing the master sheet of such set on the dye layer of said carbon sheet, passing the assembled set through a tackifying chamber whereby successive portions of said powder particle image are progressively tackified to a degree to adhere to the material of both said sheets, progressively pressing successive portions of the master and carbon sheets into intimate contact at a predetermined pressure in timed relation to the tackification of corresponding portions of the intervening powder particle image, and maintaining said pressure for a predetermined time period.

7. An apparatus for bonding portions of the dye layer of the carbon sheet of a spirit duplicating set to the master sheet thereof, said bonded portions having a configuration corresponding to a pattern of tackifiable material arranged between said sheets, said apparatus comprising a vapor chamber containing an atmosphere of solvent vapor for said tackifiable materials, means for supplying solvent vapor to said chamber, means for supporting and advancing a spirit duplicating set through said vapor chamber in a predetermined transit time, said transit time being selected to permit the solvent vapor in said chamber to effect a predetermined degree of tackification of said tackifiable material, and means effective thereafter for urging said sheets into intimate contact with said tackifiable material at predetermined pressure in timed relation to the attainment of said predetermined degree of tackification and for maintaining said pressure for a time period to effect the bonding of said tackified material to the surface of both of said sheets.

8. An apparatus for bonding portions of the dye layer of the carbon sheet of a spirit duplicating set to the master sheet thereof, said bonded portions having a configuration corresponding to a pattern of tackifiable material arranged between said sheets, said apparatus comprising a vapor chamber for tackifying the pattern of tackifiable material, pressure means effective thereafter for urging the sheets of the spirit duplicating set into intimate contact with said tackified material, feed rolls to advance the duplicating set through said vapor chamber and into contact with said pressure means, and means for supporting the duplicating set during passage through said vapor chamber, said vapor chamber comprising a box-like structure having slots at either side to permit the ingress and egress of the spirit duplicating set, a solvent-retaining trough supported in said box-like structure, solvent vaporizing means arranged in said trough, and a reservoir for supplying a solvent for said tackifiable material to said trough.

9. An apparatus for bonding portions of the dye layer of the carbon sheet of a spirit duplicating set to the master sheet thereof, said bonded portions having a configuration corresponding to a pattern of tackifiable material arranged between said sheets, said apparatus comprising a chamber containing a solvent vapor for tackifying the pattern of tackifiable material, means to supply solvent vapor to said chamber, a pressure roll assembly effective thereafter for urging the sheets of the spirit duplicating set into intimate contact with the then tackified material, and feed rolls to advance the duplicating set through said vapor chamber and into contact with said pressure rolls, and means for supporting the duplicating set during passage through said chamber, said pressure roll assembly comprising parallel rolls of resilient material and means for urging said rolls into contact at predetermined pressure, whereby said rolls are distorted laterally to form a relatively broad pressure-applying surface.

10. An apparatus for bonding portions of the dye layer of the carbon sheet of a spirit duplicating set to the master sheet thereof, said bonded portions having a configuration corresponding to a pattern of tackifiable material arranged between said sheets, said apparatus comprising a chamber containing a solvent vapor for tackifying the pattern of tackifiable material, means to supply solvent vapor to said chamber, pressure rolls effective thereafter for urging said sheets into intimate contact with the then tackified material, feed rolls to advance the duplicating set through said vapor chamber and into contact with said pressure rolls, means for supporting the duplicating set during passage through said chamber, and a feed table assembly for supporting the duplicating set during advancement by said feed rolls, said feed table assembly including a substantially horizontally arranged feed table adjacent said feed rolls for supporting the carbon sheet of the spirit duplicating set and a second feed table angularly disposed with reference to said first-mentioned table for supporting the master sheet of said set in spaced relation to said carbon sheet.

11. An apparatus for bonding portions of the dye layer of the carbon sheet of a spirit duplicating set to the master sheet thereof, said bonded portions having a configuration corresponding to a pattern of tackifiable material arranged between said sheets, said apparatus comprising a chamber containing a solvent vapor for tackifying the pattern of tackifiable material, means to supply solvent vapor to said chamber, pressure rolls effective thereafter for urging said sheets into intimate contact with the then tackified material, a feed roll to advance the duplicating set through said vapor chamber and into contact with said pressure rolls, means for supporting the duplicating set during passage through said chamber, a feed table assembly for supporting the duplicating set during advancement by said feed roll, said feed table assembly including a substantially horizontally arranged feed table adjacent said feed roll for supporting the carbon sheet of the spirit duplicating set and a second feed table angularly disposed with reference to said first-mentioned table for supporting the master sheet of said set in spaced relation to said carbon sheet, and a closing roll arranged in cooperative relationship with said feed roll for closing said master sheet on said carbon set and for maintaining said duplicating set engaged with the feed roll.

12. An apparatus for bonding portions of the dye layer of the carbon sheet of a spirit duplicating set to the master sheet thereof, said bonded portions having a configuration corresponding to a pattern of tackifiable material arranged between said sheets, said apparatus comprising a chamber containing a solvent vapor for tackifying the pattern of tackifiable material, means to supply solvent vapor to said chamber, pressure rolls effective thereafter for urging said sheets into intimate contact with the then tackified material, feed rolls to advance the duplicating set through said vapor chamber and into contact with said pressure rolls, means for supporting the duplicating set during passage through said chamber, and driving means for actuating said feed rolls at a peripheral rate to permit the solvent vapor in said chamber to effect a predetermined degree of tackification of the pattern of tackifiable material during the period that the duplicating set is passing through the vapor chamber and for actuating said pressure rolls at a peripheral rate equal to or slightly in excess of the peripheral rate of said feed rolls.

13. An apparatus for bonding portions of the dye layer of the carbon sheet of a spirit duplicating set to the master sheet thereof, said bonded portions having a configuration corresponding to a pattern of tackifiable material arranged between said sheets, said apparatus comprising a vapor chamber for tackifying the pattern of tackifiable material, pressure means for urging said sheets into intimate contact with the then tackified material, and feed rolls to advance the duplicating set through said vapor chamber and into contact with said pressure rolls, means for supporting the duplicating set during passage through said chamber, said vapor chamber comprising a box-like structure having slots at either side to permit the ingress and egress of the spirit duplicating set, vapor seals for closing said slots to ambient air in the absence of a duplicating set, a solvent-retaining trough supported in said box-like structure, solvent vaporizing means arranged in said trough, and a reservoir for supplying a solvent for said tackifiable material to said trough.

14. An apparatus for bonding portions of the dye layer of the carbon sheet of a spirit duplicating set to the master sheet thereof, said bonded portions having a configuration corresponding to a pattern of tackifiable material arranged between said sheets, said apparatus comprising a vapor chamber for tackifying the pattern of tackifiable material, pressure means for urging said sheets into intimate contact with the then tackified material, and feed rolls to advance the duplicating set through said vapor chamber and into contact with said pressure rolls, said vapor chamber comprising a box-like structure having slots at either side to permit the ingress and egress of the spirit duplicating set, vapor seals for closing said slots to ambient air in the absence of a duplicating set, a solvent-retaining trough supported in said box-like structure, solvent vaporizing means arranged in said trough, a reservoir for supplying a solvent for said tackifiable material to said trough, and means within said chamber to prevent buckling of the duplicating set during its passage therethrough.

15. An apparatus for tackifying a powder particle pattern arranged between the master and carbon sheets of a spirit duplicating set and for bonding said pattern to the opposed surfaces of said sheets comprising a tackifying chamber having a powder solvent vapor therein and having slots at either side to permit the ingress and egress of the spirit duplicating set, means to supply solvent vapor to said chamber, pressure rolls adjacent the egress slot of said chamber for urging said sheets into intimate contact with said pattern after the tackification thereof, feed rolls adjacent the ingress slot of said chamber for feeding the spirit duplicating set through the slots of said chamber and into engagement with said pressure rolls, and means for supporting the duplicating set during passage through said chamber.

(References on following page)

References Cited in the file of this patent

UNITED STATES PATENTS

| | | |
|---|---|---|
| 2,073,033 | Szasz | Mar. 9, 1937 |
| 2,095,075 | Neidich | Oct. 5, 1937 |
| 2,254,483 | Hess et al. | Sept. 2, 1941 |
| 2,255,859 | Quigley | Sept. 16, 1941 |
| 2,290,365 | Wynne | July 21, 1942 |
| 2,357,809 | Carlson | Sept. 12, 1944 |
| 2,535,642 | Liebowitz | Dec. 26, 1950 |
| 2,590,849 | Dungler | Apr. 1, 1952 |
| 2,624,652 | Carlson | Jan. 6, 1953 |
| 2,661,289 | Mayo et al. | Dec. 1, 1953 |
| 2,684,301 | Mayo | July 20, 1954 |
| 2,684,901 | Sabel et al. | July 27, 1954 |
| 2,726,166 | Greaves | Dec. 6, 1955 |
| 2,738,727 | Dorman et al. | Mar. 20, 1956 |